(12) United States Patent
Yoshida et al.

(10) Patent No.: US 6,430,807 B2
(45) Date of Patent: Aug. 13, 2002

(54) WORKPIECE HANDLING DEVICE

(75) Inventors: Tatsuya Yoshida; Takahiro Ueda, both of Gunma; Takahiro Sakamoto, Tochigi, all of (JP)

(73) Assignee: Calsonic Kansei Corporation, Tokyo (JP)

(*) Notice: Subject to any disclaimer, the term of this patent is extended or adjusted under 35 U.S.C. 154(b) by 0 days.

(21) Appl. No.: 09/961,277

(22) Filed: Sep. 25, 2001

Related U.S. Application Data

(62) Division of application No. 09/414,165, filed on Oct. 8, 1999, now Pat. No. 6,315,158.

(51) Int. Cl.⁷ .......................... H23P 19/00; B23P 19/00; B23P 19/04; B25B 27/14; B21D 53/02
(52) U.S. Cl. .................. 29/791; 29/700; 29/281.3; 29/890.038; 29/281.5; 29/252; 29/726; 29/890.052
(58) Field of Search .............. 29/700, 791, 890.038, 29/238, 281.1, 281.3, 282, 33 G, 33 K, 33 T, 464, 468, 281.5, 252, 726, 890.052; 414/789, 798.2, 798.7, 789.5

(56) References Cited

U.S. PATENT DOCUMENTS

| 3,703,242 A | 11/1972 | Marradi | 214/302 |
| 4,451,732 A | 5/1984 | Spongr et al. | 250/308 |
| 6,109,085 A | 8/2000 | Kikuchi et al. | 72/238 |
| 6,276,513 B1 | 8/2000 | Asano et al. | 198/406 |

FOREIGN PATENT DOCUMENTS

| JP | 3-166023 | 7/1991 |
| JP | 3-199896 | 9/1991 |
| JP | 4-35831 | 3/1992 |
| JP | 4-113113 | 10/1992 |
| JP | 6-114455 | 4/1994 |
| JP | 9-85541 | 3/1997 |
| JP | 9-85542 | 3/1997 |
| JP | 11-70424 | 3/1999 |

*Primary Examiner*—S. Thomas Hughes
*Assistant Examiner*—John C Hong
(74) *Attorney, Agent, or Firm*—Foley & Lardner

(57) ABSTRACT

As means for handling elongate and flat workpieces flowing in a manufacturing line, three handling devices are provided. First one is a workpiece transmitting device which functions to push down, one after another, the frontmost one of a mass of raised workpieces horizontally put on a table structure. Second one is a parts-mass compressing device which compresses a mass of raised workpieces horizontally put on a table structure to a desired smaller size by using moving and fixed plates. Third one is an assembling device which connects a header pipe to each side of a compressed mass of raised workpieces horizontally put on a table structure.

9 Claims, 17 Drawing Sheets

FIG.8
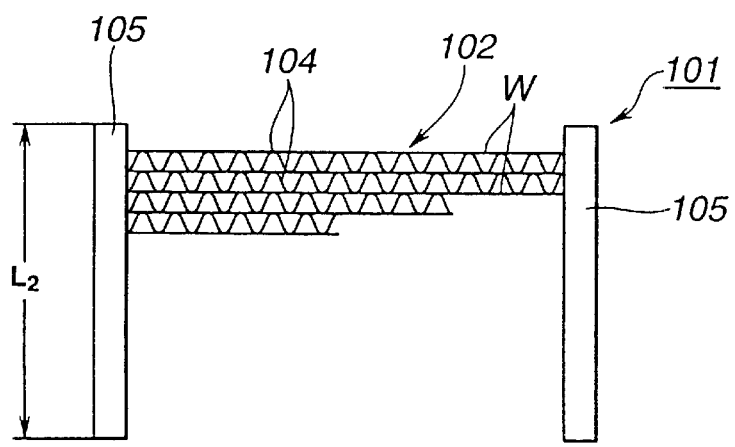
FIG.9A
FIG.9B
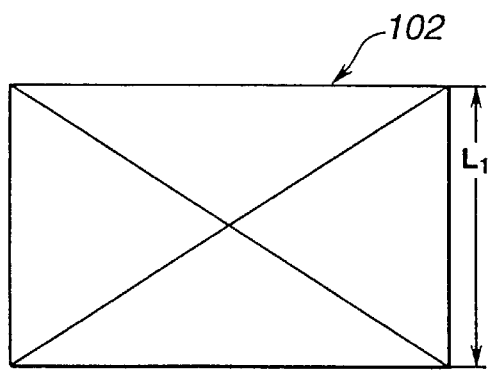
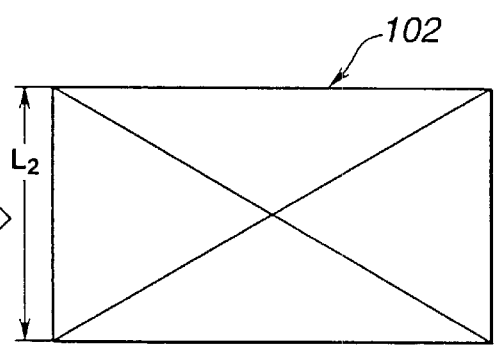
COMPRESSION

WORKPIECE HANDLING DEVICE

This application is a Divisional of application Ser. No. 09/414,165, filed Oct. 8, 1999, now U.S. Pat. No. 6,315,158.

BACKGROUND OF THE INVENTION

The present invention relates in general to manufacturing lines for manufacturing heat exchangers used in automotive air conditioners, each heat exchanger comprising a plurality of parallel flat heat extending tubes arranged to constitute a rectangular mass, a plurality of outer fins alternatively arranged in the mass of the flat heat extending tubes and two header pipes connected to opposed sides of the mass. More particularly, the present invention relates to the heat exchanger manufacturing lines of a type which comprises a header pipe producing device which produces the header pipes by pressing or curling flat metal plates, a flat tube producing device which produces the flat heat exchanging tubes each including an elongate flat metal tube and an elongate inner metal fin installed in the flat tube, an outer fin producing device which produces the outer fins by corrugating an elongate metal plate, and assembling devices which produce the heat exchangers one after another by assembling the header pipes, the elongate flat tubes and the outer fins. More specifically, the present invention is concerned with workpiece handling devices arranged in the heat exchanger manufacturing line, which handle the workpieces or flat heat exchanging tubes for assisting the operation of the above-mentioned producing and assembling devices.

SUMMARY OF THE INVENTION

It is a first object of the present invention to provide a workpiece transmitting device which pushes down, one after another, the frontmost one of a mass of raised workpieces horizontally put on a table structure.

It is a second object of the present invention to provide a parts-mass compressing device which compresses a mass of raised workpieces horizontally put on a table structure to a desired smaller size by using moving and fixed plates.

It is a third object of the present invention to provide an assembling device which connects a header pipe to each side of a compressed mass of raised workpieces horizontally put on a table structure.

According to a first aspect of the present invention, there is provided a workpiece transmitting device for use in a manufacturing line handling elongate and flat workpieces. The workpiece transmitting device comprises a base stand having a table structure on which a mass of raised workpieces is put horizontally, each workpiece standing vertically on the stable structure on one longer side thereof; a stopper positioned ahead of and above a front end of the table structure to provide therebetween a clearance whose thickness generally corresponds to that of the workpiece; a pressing member for pressing and moving the mass toward the stopper; and a vertically movable striker positioned above the stopper, the stopper pushing down, one after another, the frontmost one of the mass of raised workpieces horizontally put on the table structure through the clearance when the frontmost one comes into abutment with the stopper.

According to a second aspect of the present invention, there is provided a parts-mass compressing device for use in a manufacturing line handling elongate and flat workpieces. The parts-mass compressing device comprises a base stand having a table structure on which a mass of raised workpieces is put horizontally, each workpiece standing vertically on the table structure on one longer side thereof; a stopper plate fixed to one end of the table structure; a moving plate movable on the table structure toward and away from the stopper plate, so that when the mass is placed between the stopper plate and the moving plate, movement of the moving plate toward the stopper plate compressing the mass; a toggle mechanism for driving the moving plate, the toggle mechanism comprising first and second toggle links which are pivotally connected to at their inner ends, an outer end of the first toggle link being pivotally connected to a fixed portion of the base stand and an outer end of the second toggle link being pivotally connected to the moving plate; and a power cylinder mechanism which has a piston stem whose head is pivotally connected to the inner ends of the first and second toggle links.

According to a third aspect of the present invention, there is provided an assembling device for use in a manufacturing line handling elongate and flat workpieces. The assembling device comprises a base stand having a table structure on which a mass of raised workpieces is put horizontally, each work piece standing vertically on the table structure on one longer side thereof; two head members arranged at both sides of the table structure, each head member being vertically moved by a drive unit; two edge lining up mechanisms carried by the head members respectively, each lining up mechanism including a movable bar which is moved toward edges of the raised workpieces on the stable structure to abut against the edges to line up the same; two header pipe temporarily holding mechanisms carried by the head members respectively, each temporarily holding mechanism temporarily holding a header pipe which is to be fixed to a side of the mass of the raised workpieces; a parts-mass pressing board for pressing the mass against the table structure; and two header pipe fitting devices arranged at both sides of the table structure, each fitting device catching the header pipe from said temporarily holding mechanism and pressing the same against the side of said mass thereby to connect the same to the side.

BRIEF DESCRIPTION OF THE DRAWINGS

Other objects and advantages of the present invention will become apparent from the following description when taken in conjunction with the accompanying drawings, in which:

FIG. 8 is a schematic view of a condenser which is produced by a manufacturing line including the parts-mass compressing device of the second embodiment;

FIG. 9A is a schematic view of a mass of raised flat tubes before being compressed;

FIG. 9B is a schematic view of the mass after being compressed;

DETAILED DESCRIPTION OF THE EMBODIMENTS

Figure 1:
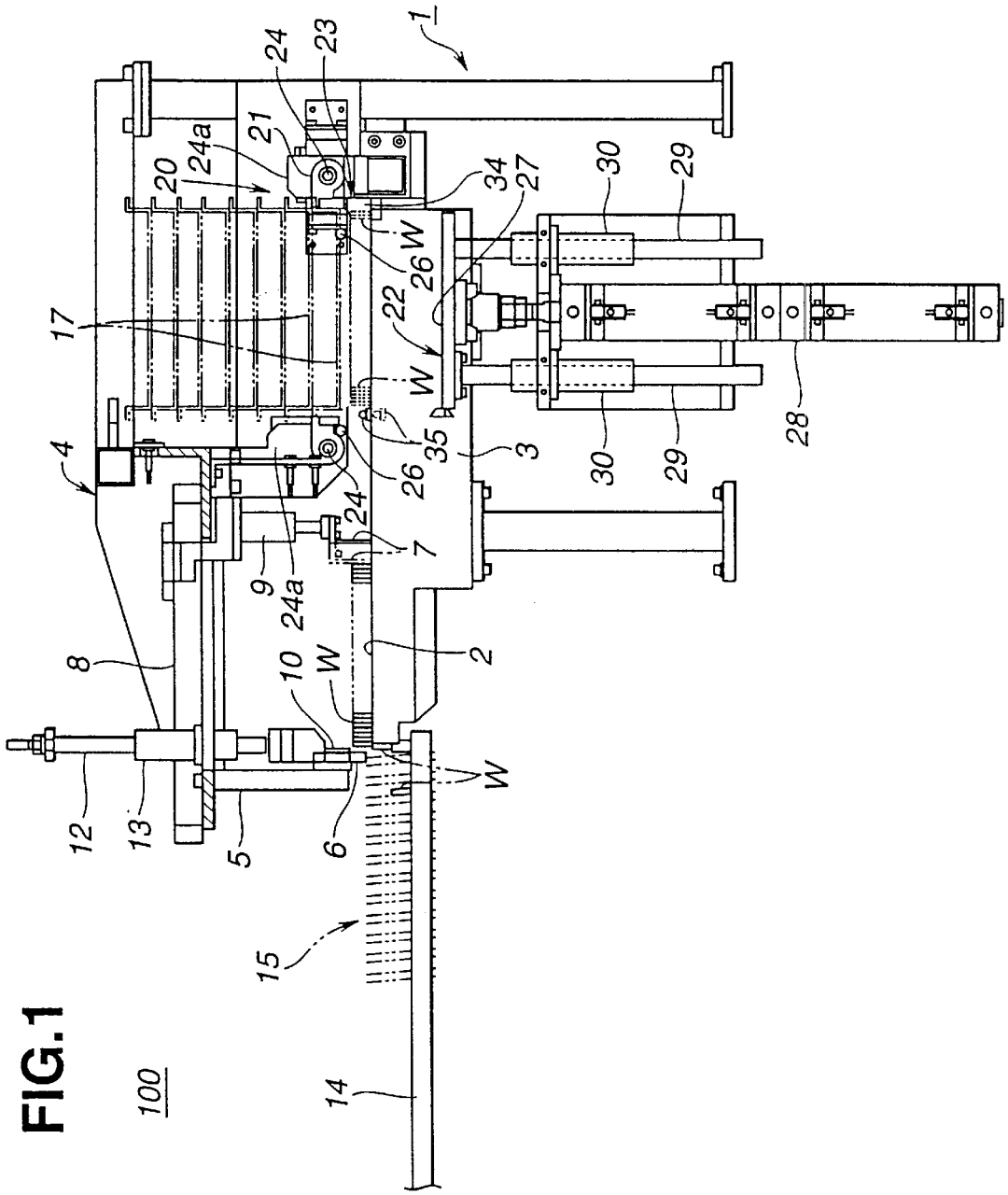
FIG. 1 is a vertically sectioned side view of a workpiece transmitting device of a first embodiment of the present invention.

In the following, first, second and third embodiments 100, 200 and 300 of the present invention will be described with reference to the accompanying drawings.

In the description, directional terms, such as "forward", "rearward", "upstream", "downstream", "front", "rear" and the like are to be understood with respect to a direction in which workpieces flow in the manufacturing line. Furthermore, other directional terms, such as, right, left, rightward, leftward and the like are to be understood with respect to the drawing on which an associated structure is illustrated.

Referring to FIGS. 1 to 5, particularly FIG. 1, there is shown a workpiece transmitting device 100 of the first embodiment of the present invention, which is arranged in a manufacturing line of producing a condenser of an automotive air conditioner.

Figure 3:
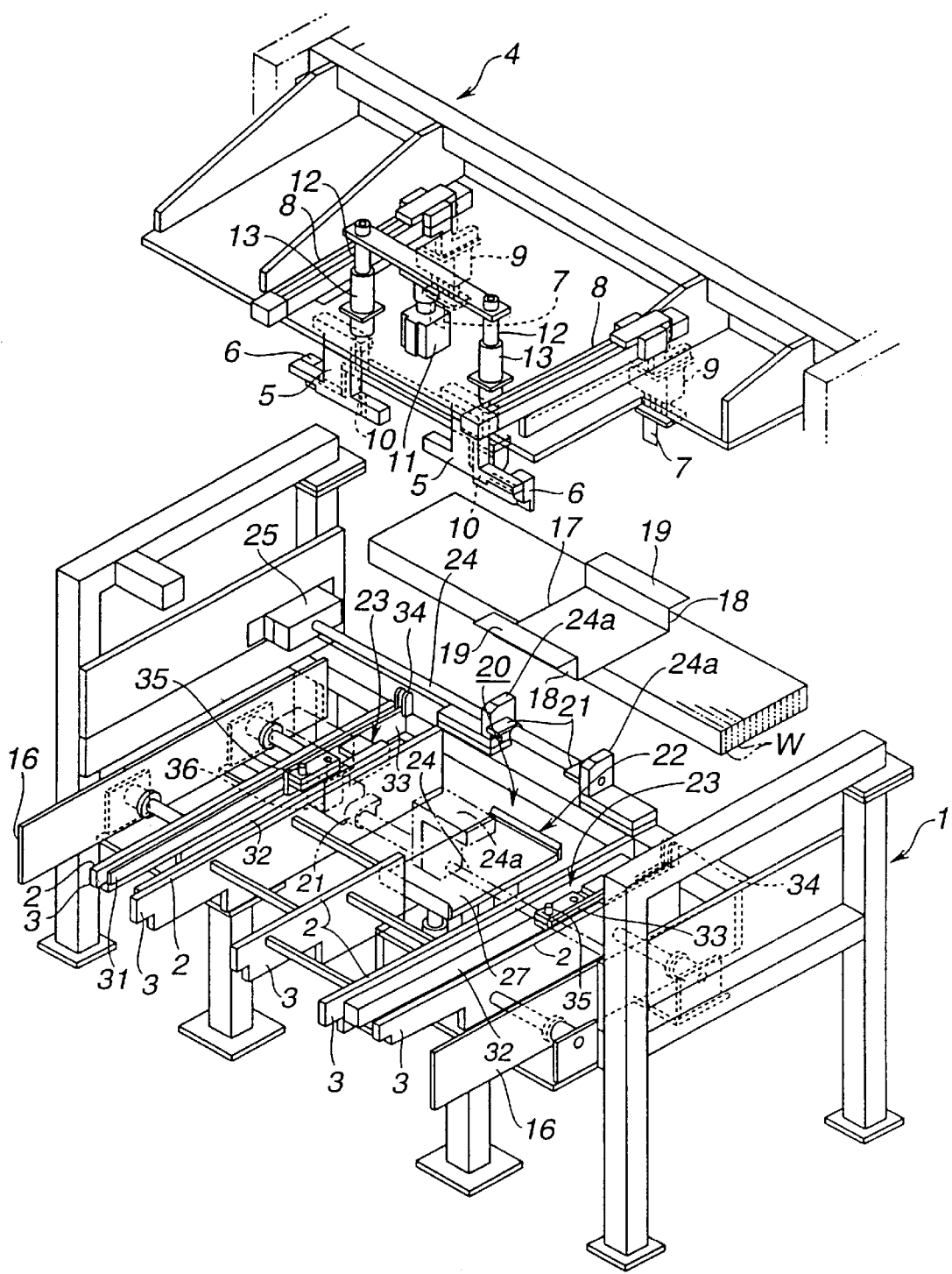
FIG. 3 is a perspective view of the workpiece transmitting device of the first embodiment.
Figure 4:
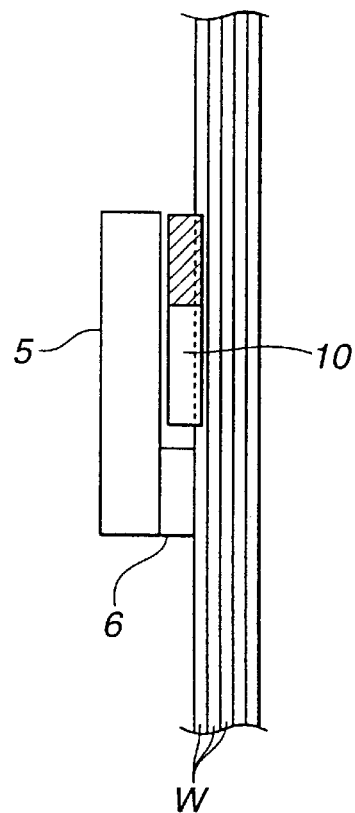
FIG. 4 an enlarged plan view of a portion of the workpiece transmitting device where essential parts are arranged.
Figure 5:
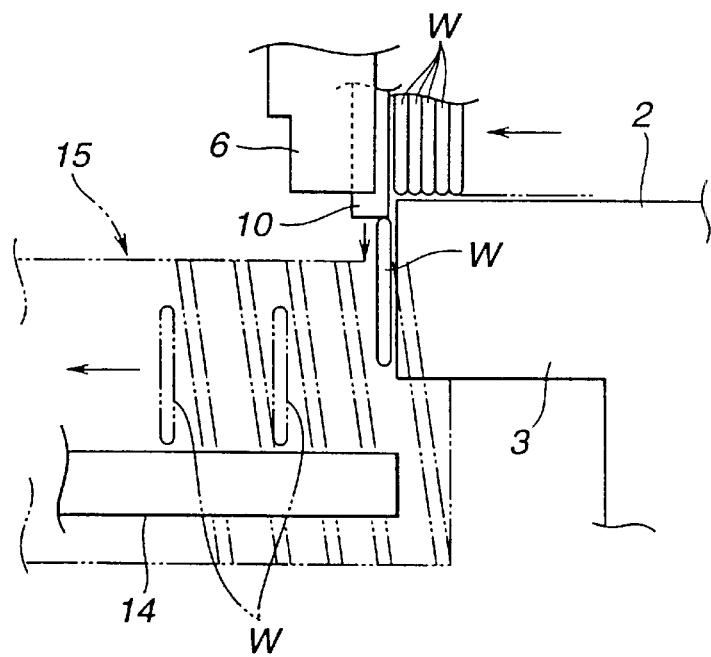
FIG. 5 is an enlarged side view of the portion of the workpiece transmitting device.

In the drawings, denoted by numeral 1 is a base stand which, as is seen from FIG. 3, comprises five parallel frames 3 each having a horizontal flat upper edge 2. The upper edges 2 of these five frames 3 are flush with one another.

As is seen from FIGS. 1 and 3, above a rear portion of the base stand 1, there is arranged a striker supporting structure 4. As is best seen from FIG. 3, to a front lower surface of the striker supporting structure 4, there are fixed a pair of leg members 5 each having a stopper 6.

As is seen from FIG. 1, the stoppers 6 are positioned ahead of front edges of the frames 3 of the base stand 1 by a distance which generally corresponds to a thickness of a flat tube "W". It is to be noted that the flat tube "W" is an essential element for forming a core unit of a condenser, and comprises a flat hollow tube and an inner fin installed therewith.

As seen from FIG. 3, beneath the striker supporting structure 4, there are movably mounted a pair of pressing members 7. These pressing members 7 function to move a mass (for example, one hundred) of raised flat tubes "W", which are put on the horizontal flat upper edges 2 of the frames 3, toward the stoppers 6. For moving the pressing members 7 toward and away from the stoppers 6, first respective power cylinder mechanisms 8 are mounted to the striker supporting structure 4.

For vertically moving the pressing members 7, second respective power cylinder mechanisms 9 are also mounted to the striker supporting structure 4. That is, once the pressing members 7 come to their frontmost positions finishing one cycle of the flat tube moving operation, the pressing members 7 are lifted up to a certain upper position by the second power cylinder mechanisms 9 and moved back to their rearmost positions by the first power cylinder mechanisms 8, and thereafter when a new mass of raised flat tubes "W" is fed to the front portions of the horizontal flat upper edges 2 of the frames 3, the pressing members 7 are moved down by the second power cylinder mechanisms 9 to their start positions.

As is seen from FIG. 1, each of the leg members 5 is equipped with a vertically movable striker 10 which functions to push down, one after another, the frontmost one of the mass of the flat tubes "W" when the mass is moved forward by the pressing members 7 and the frontmost one abuts against the stoppers 6. The function of the striker 10 will be well understood from FIGS. 4 and 5. As is seen from these drawings, when the frontmost flat tube "W" comes into contact with the stoppers 6, the strikers 10 strike or push down the flat tube "W" through a clearance between the stoppers 6 and the front edges of the frames 3. As will be described in detail hereinafter, the dropped flat tube "W" is caught by a table 14.

As is seen from FIG. 3, the two strikers 10 are driven by a drive mechanism which comprises a single power cylinder 11 which has a piston therein, two rods 12 which have lower ends respectively connected to the strikers 10 and upper ends connected to the piston of the power cylinder 11 through a common rod (no numeral) and two holders 13 which slidably hold the rods 12 respectively.

As is seen from FIG. 1, below the leg members 5, there extends a table 14 horizontally. In the illustrated embodiment, a front end of the table 14 is positioned below the front edges of the frames 3. That is, the flat tubes "W" pressed down by the strikers 10 and thus dropped from the horizontal flat upper edges 2 of the frames 3 are caught by the table 14.

Figure 2:
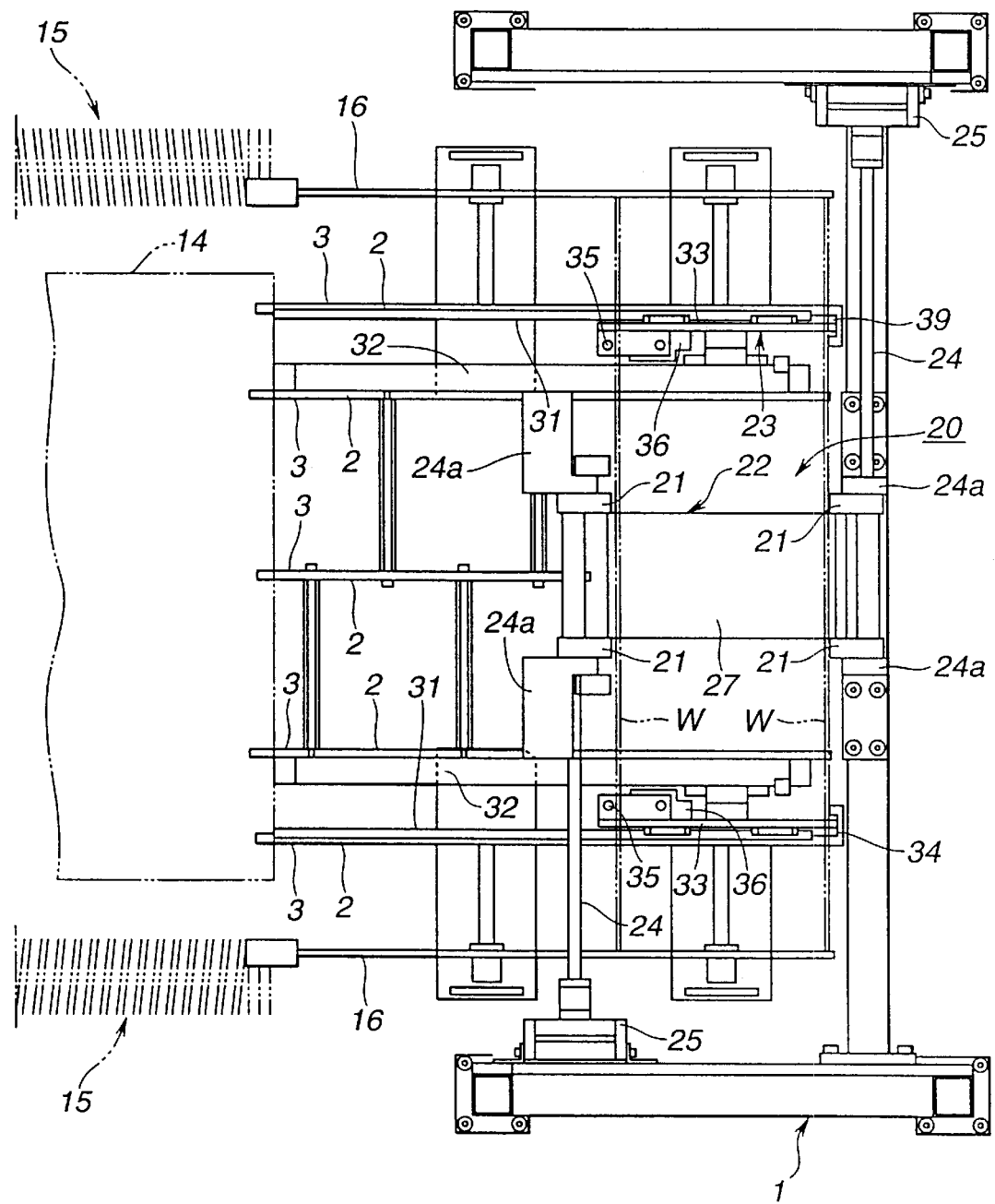
FIG. 2 is a plan view of the workpiece transmitting device of the first embodiment with some structures removed.

As is understood from FIGS. 1 and 2, along both sides of the table 14, there extend a pair of screw rods 15 which constitute a screw conveyer 15 by which the dropped flat tubes "W" are conveyed forward, that is, leftward in FIGS. 1 and 2, while being kept raised.

As is seen from FIGS. 2 and 3, along the laterally outermost frames 3, there extend elongate guide plates 16 by which the forward movement of the mass of flat tubes "W" is smoothly and assuredly guided.

The outermost frames 3 are provided at their inner sides with respective guide rails 31 for the reason which will become apparent from the following.

As is seen from FIGS. 1, 2 and 3, a workpiece feeding mechanism 20 is arranged at a rear portion of the base stand 1.

The workpiece feeding mechanism 20 comprises two pairs of tray holders 21 which support thereon a certain number of piled trays 17 each containing a certain number (for example, one hundred) of raised flat tubes "W", a lifting and conveying mechanism 22 which catches the lowermost one of the piled trays 17 on the tray holders 21 and conveys the mass of the raised flat tubes "W" in the tray 17 onto the horizontal flat upper edges 2 of the frames 3, and a conveying mechanism 23 which catches the mass of the raised flat tubes "W" and conveys the same toward the above-mentioned stoppers 6.

As is seen from FIG. 3, the tray 17 comprises a rectangular base wall (no numeral), a pair of opposed side walls 18 and flanges 19 extending outward from the side walls 18. As is understood from this drawing, the mass of the raised flat tubes "W" is received in the tray 17 having longitudinally opposed portions thereof largely projected from the tray 17.

As is seen from FIGS. 2 and 3, paired tray holders 21 are secured to a pivot shaft 24 which is pivotally supported by spaced brackets 24a. These tray holders 21 can pivot between a horizontal position and a vertical position. For assuring the horizontal position of the tray holders 21, stopper pins 26 are provided as is seen from FIG. 1. As is understood from FIG. 3, for supporting the tray 17 on the tray holders 21, the flanges 19 of the tray 17 are seated on the tray holders 21.

As is seen from FIG. 2, each pivot shaft 24 is driven by a motor 25. That is, when the lifting and conveying mechanism 22 starts to operate and thus the lowermost tray 17 is somewhat lifted, the motor 25 drives the pivot shaft 24 in a direction to pivot the paired tray holders 21 upward thereby canceling the engagement of the flanges 19 of the tray 17 with the tray holders 21. When thereafter the lifting and conveying mechanism 22 starts its downward movement, the lowermost tray 17 is moved down to a certain lower position through a clearance between the two pairs of tray holders 21. Upon passing of the tray 17, the motor 25 pivots the tray holders 21 to the horizontal position permitting a new lowermost tray 17 to be held by the tray holders 21. That is, by pivoting the tray holders 21 between their horizontal and vertical positions in response to the lifting and lowering operation of the lifting and conveying mechanism 22, the trays 17 taking the lowermost position of the piled trays 17 are removed one after another.

As is seen from FIGS. 1, 2 and 3, the lifting and conveying mechanism 22 comprises a rectangular lift table 27 which moves vertically in a space defined by inside frames 3. For moving the lift table 27, there is used a power cylinder mechanism 28 which is positioned below the frames 3. For smoothing the vertical movement of the lift table 27, a guide mechanism is arranged which comprises guide rods 29 and rod holders 30 which slidably hold the guide rods 29. As is mentioned hereinabove, when the lifting and conveying mechanism 22 carries out a lifting operation, the lowermost tray 17 is put onto the lift table 27, and when then the lifting and conveying mechanism 22 carries out a lowering operation, the tray 17 on the lift table 27 is moved down to the lower position through the clearance between the two pairs of tray holders 21. During the downward movement of the tray 17, the raised flat tubes "W" in the tray 17 are brought into contact with the horizontal flat upper edges 2 of the frames 3 at their longitudinally end portions and thus left on the upper edges 2.

Although not shown in the drawings, a tray shooter is arranged near a lower portion of the lifting and conveying mechanism 22. That is, when the tray 17 is moved down toward the lower position releasing the flat tubes "W", the tray 17 is forced to fall into the tray shooter and discharged to the outside.

As is best seen from FIGS. 2 and 3, the conveying mechanism 23 generally comprises moving plates 33 which are slidably engaged with the guide rails 31, and power cylinder mechanisms 32 which move the moving plates 33 in fore-and-aft directions.

As is seen from FIGS. 1 and 3, each moving plate 33 is provided at its rear end with a fixed projection 34 which projects upward beyond the horizontal flat upper edges 2 of the frames 3, and each moving plate 33 is provided at its front end with a retractable pin 35 which can project upward beyond the horizontal flat upper edges 2 when an associated power cylinder 36 is energized. It is to be noted that by the two rear fixed projections 34 and the two front retractable pins 35, the mass of the raised flat tubes "W" transmitted onto the horizontal flat upper edges 2 is held. Of course, when holding the mass, the front retractable pins 35 assume their projected position.

As is seen from FIG. 1, the mass of the raised flat tubes "W" horizontally put on the horizontal flat upper edges 2 is moved forward, that is, toward the stoppers 6 by the moving plates 33 of the conveying mechanism 23. When the mass comes to a predetermined front position, the front retractable pins 35 are retracted and then the moving plates 33 are moved back to the ear position leaving the mass of the flat tubes "W" at the front position of the horizontal flat upper edges 2 of the frames 3.

In the following, operation of the above-mentioned workpiece transmitting device 100 will be described with reference to the drawings.

For ease of understanding, the description will be commenced with respect to a condition wherein as is shown in FIG. 1, a certain number of trays 17 are piled on the tray holders 21 of the workpiece feeding mechanism 20.

When the lifting and conveying mechanism 22 starts to operate and thus the lowermost tray 17 is somewhat lifted, the tray holders 21 are pivoted upward by the motors 25 (see FIG. 2) thereby to cancel the engagement of the flanges 19 of the tray 17 with the tray holders 21. When then the lifting and conveying mechanism 22 starts its downward movement, the lowermost tray 17 is moved down to a certain lower position through the clearance between the two pairs of tray holders 21. Upon passing of the tray 17 through the clearance, the motors 25 pivot the two pairs of tray holders 21 to their horizontal position permitting a new lowermost tray 17 to be held by the tray holders 21.

During the downward movement of the aforementioned lowermost tray 17, the raised flat tubes "W" in the tray 17 are brought into contact with the horizontal flat upper edges 2 of the frames 3 at their longitudinally end portions and thus left on the upper edges 2. More specifically, the mass of the flat tubes "W" on the horizontal flat upper edges 2 is held between the two rear fixed projections 34 of the moving plates 33 and the two front retractable pins 35 of the same. The tray 17 thus removing the flat tubes "W" therefrom falls into the tray shooter and discharged to the outside.

Then, the conveying mechanism 23 starts to operate. Upon this, the moving plates 33 of the mechanism 23 are moved forward carrying the mass of the flat tubes "W" toward the stoppers 6. When the mass of the flat tubes "W" comes to the predetermined front position, the front retractable pins 35 are retracted and then the moving plates 33 are moved back to the rear position leaving the mass of the flat tubes "W" at the front position of the horizontal flat upper edges 2 of the frames 3.

Then, the pair of pressing members 7 start to move down from their rearmost stand-by positions to their start positions and move the mass of the flat tubes "W" forward and finally contact the frontmost one of the flat tubes "W" with the stoppers 6. Upon this, the strikers 10 strike or push down the frontmost flat tube "W" through the clearance between the stoppers 6 and the front edges of the frames 3. The dropped flat tube "W" is caught by the table 14 having the longitudinally both ends held by the screw rods 15. By repeating the above-mentioned tube dropping operation, all of the mass of the flat tubes "W" are dropped to the table 14 and conveyed forward one after another by the screw rods 15.

During the forward movement of the flat tubes "W" by the screw rods 15, corrugated outer fins (not shown) are applied to the line of the flat tubes "W" in such a manner that one outer fin is put between adjacent two of the flat tubes "W". These parts are conveyed to an assembling section (not shown).

Once the pressing members 7 come to their frontmost positions finishing one cycle of the flat tube moving operation, the pressing members 7 are lifted up to a certain upper position and moved back to their rearmost stand-by positions. When thereafter a new mass of raised flat tubes "W" is fed to the front portions of the horizontal flat upper edges 2 of the frames, the pressing members 7 are moved down by the second power cylinder mechanisms 9 to their start positions.

As is described hereinabove, in the workpiece transmitting device 100 of the first embodiment of the present invention, due to usage of the strikers 10, the raised flat tubes "W" on the front portions of the horizontal flat upper edges 2 can be dropped onto the table 14 one after another. This brings about a labor saving in transmitting the workpieces to the assembling section.

Once the pressing members 7 come to their frontmost positions finishing one cycle of the flat tube moving operation, the pressing members 7 are lifted up and moved back to their rearmost stand-by positions. During this, a new mass of raised flat tubes "W" is transmitted to the front position of the horizontal flat upper edges 2 of the frames 3 by the conveying mechanism 23. This also brings about a labor saving in transmitting the workpieces to the assembling section.

Due to provision of the guide plates 16, the forward movement of the mass of the raised flat tubes "W" is smoothly and assuredly achieved.

Figure 6:
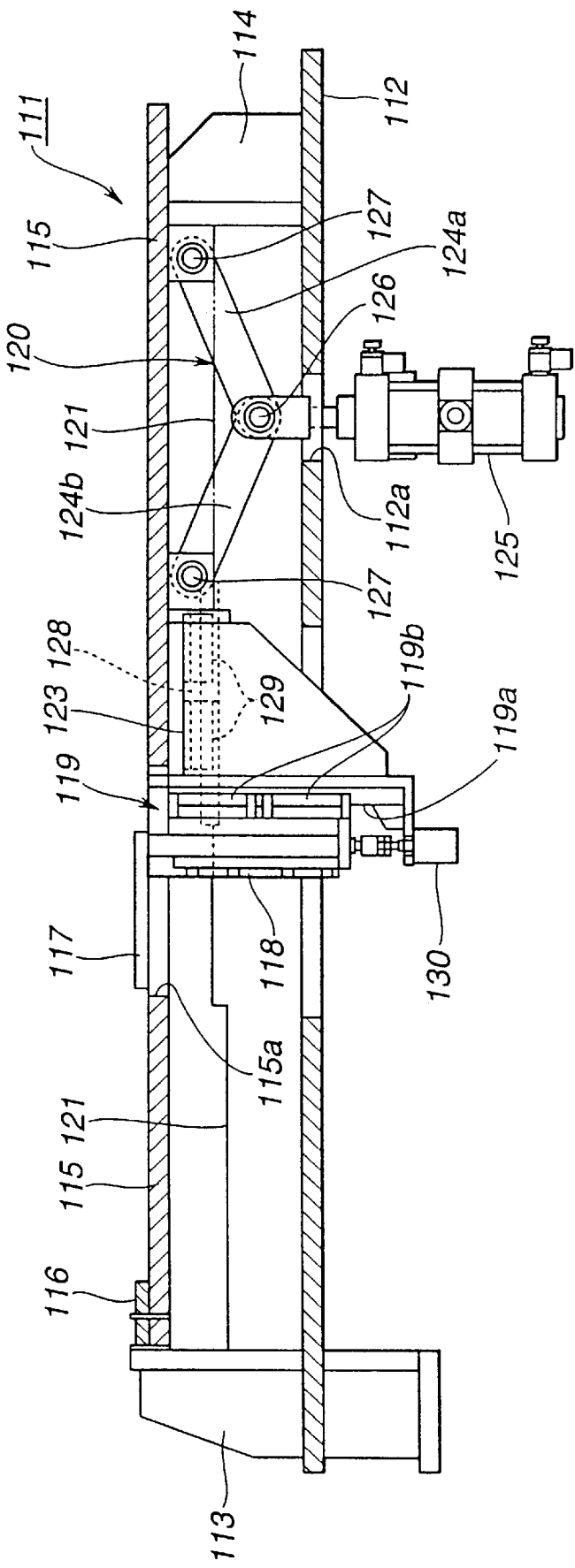
FIG. 6 is a vertically sectioned side view of a parts-mass compressing device of a second embodiment of the present invention.
Figure 7:
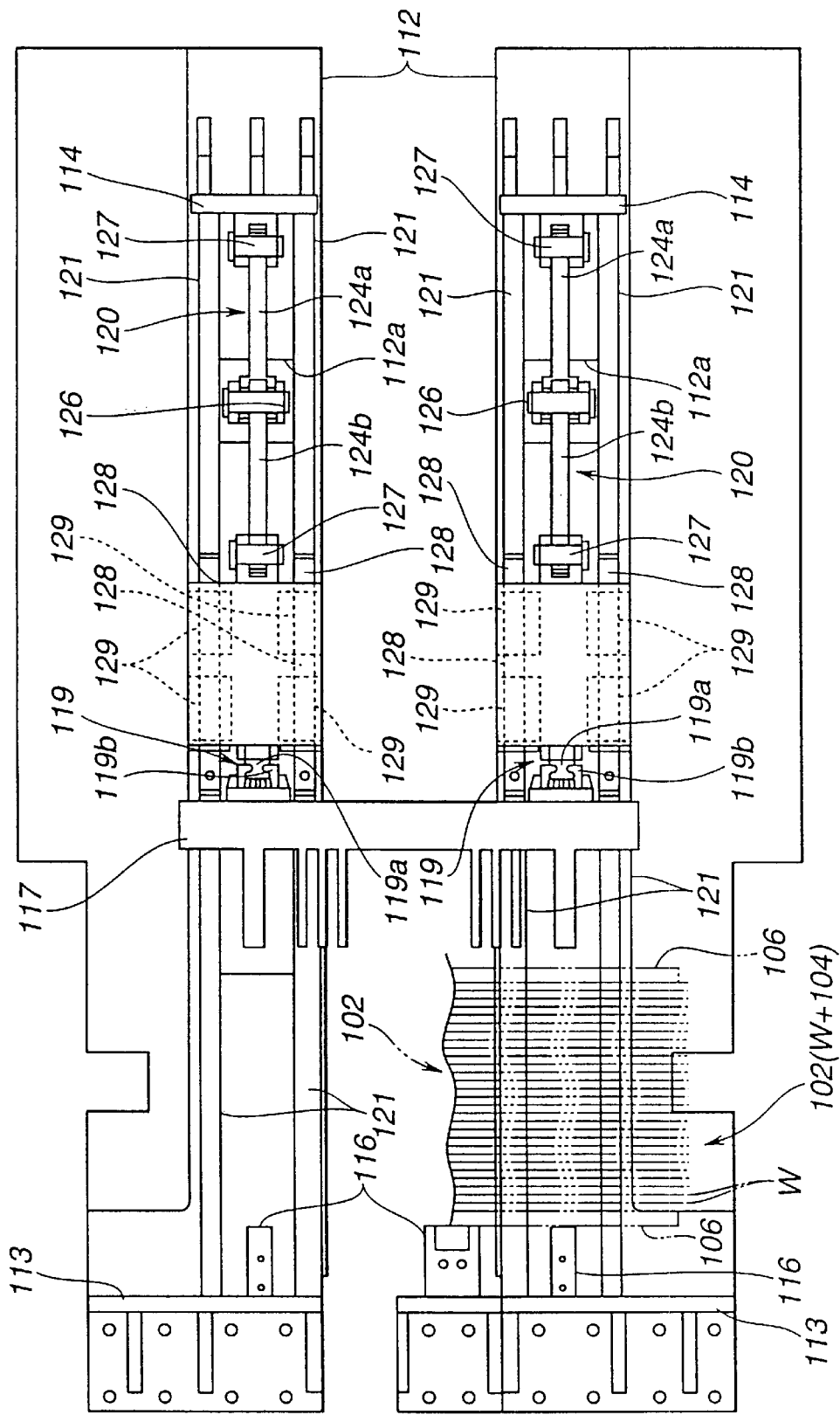
FIG. 7 is a plan view of the parts-mass compressing device of the second embodiment with a horizontal flat table removed.

Referring to FIGS. 6 to 9B, particularly FIGS. 6 and 7, there is shown a parts-mass compressing device 200 of the second embodiment of the present invention, which is arranged in the manufacturing line just downstream of the above-mentioned workpiece transmitting device 100.

In FIGS. 6 and 7, there is shown the parts-mass compressing device 200. The parts-mass compressing device 200 comprises a horizontal base plate 112 which is supported by legs (not shown). On the base plate 112, there is mounted a horizontal flat table 115 (see FIG. 6) through two left stand members 113 and two right stand members 114 (see FIG. 7).

To the left end of the flat table 115, there are fixed through bolts three stopper plates 116 each having one end contacting with the left stand member 113. These stopper plates 116 have the same length. However, if desired, a single elongate plate may be used in place of the three stopper plates 116.

On a generally center portion of the flat table 115, there is arranged a moving plate 117 which can move along an axis of the flat table 115, that is, leftward and rightward in FIGS. 6 and 7. The moving plate 117 is formed with a plurality of fingers (no numerals) which project toward the stopper plates 116.

For moving the moving plate 117, two toggle mechanisms 120A and 120B are arranged which will be described hereinafter.

Between the three stopper plates 116 and the moving plate 117, a parts-mass 102 (see FIG. 8) is to be put for being compressed. As is seen from the drawing (FIG. 8), the parts-mass 102 comprises a plurality of flat tubes "W" and a plurality of corrugated outer fins 104 which are alternatively arranged.

The two toggle mechanisms 120A and 120B are arranged in a space between the base plate 112 and the flat table 115, as is understood from FIG. 1.

Since the two toggle mechanisms 120A and 120B are the same in construction, detailed description on them will be directed to only one, that is, the mechanism 120A.

The toggle mechanism 120A is arranged between two parallel walls 121 which are mounted on the base plate 112. As is seen the drawings, each wall 121 extends between the left and right stand members 113 and 114.

The toggle mechanism 120A comprises a pair of toggle links 124a and 124b which are pivotally connected at their inner ends. An outer end of the link 124a is pivotally connected to the right stand member 114 through a pivot pin 127, and an outer end of the other link 124b is pivotally connected through a pivot pin 127 to a slider member 123 which is connected to the moving plate 117 through an after-mentioned guide structure 119.

As is seen from FIG. 6, an opening 115a is provided in the flat table 115, through which a holder 118 extends downward from the moving plate 117. The moving plate 117 is detachably connected to the holder 118, so that the moving plate 117 can be uncoupled from the holder 118. This means that a different moving plate can be connected to the holder 118 in place of the illustrated moving plate 117.

Referring back to FIG. 7, the slider member 123 is guided by the two parallel walls 121 by means of an after-mentioned guide structure. A power cylinder mechanism 125 is employed for actuating the toggle links 124a and 124b. That is, the inner ends of the two links 124a and 124b are pivotally connected through a pivot pin 126 to a piston stem of the power cylinder mechanism 125. As shown in FIG. 6, the power cylinder mechanism 125 is positioned blow the base plate 112. The piston stem of the power cylinder mechanism 125 passes through an opening 112a formed in the base plate 112.

The guide structure for guiding the movement of the slider member 123 along the two parallel walls 121 comprises two guide rails 128 which are respectively mounted on the parallel walls 121 and slide guides 129 which are fixed to the slider member 123 and slidably engaged with the guide rails 128. For the sliding engagement with the guide rails 128, each slide guide 129 is formed with a recess with which the guide rail 128 is slidably engaged.

As is best seen from FIG. 7, a guiding structure 119 is provided between the vertical base portion 117a of the moving plate 117 and the slider member 123. The guiding structure 119 comprises a vertically extending guiding rail 119a fixed to the vertical base portion 117a of the slider member 123 and a vertically extending guided track 119b fixed to the moving plate 117. The guiding rail 119a and the guided track 119b are slidably engaged with each other.

As is seen from FIG. 6, a power cylinder mechanism 130 is fixed to a lower portion of the slider member 123 for vertically moving the moving plate 117 along the guiding structure 119. That is, due to the work of the power cylinder mechanism 130, the moving plate 117 can move between the illustrated projected position (see FIG. 6) wherein the moving plate 117 is positioned above the flat table 115 and a retracted position wherein the moving plate 117 is positioned below the flat table 115.

In the following, operation of the above-described parts-mass compressing device 200 will be described with reference to the drawings.

For ease of understanding, the description will be commenced with respect to a condition wherein as is shown in FIG. 7, the moving plate 117 assumes its rightmost or rest position and a parts-mass 102 (see FIG. 8) including the alternatively arranged flat tubes "W" and corrugated outer fins 104 is put on the front or left portion of the flat table 115.

Two bars 106 are put at front and rear positions of the parts-mass 102 respectively. Then, the toggle mechanisms 120A and 120B are energized to extend the toggle links 124a and 124b. With this, the moving plate 117 is moved leftward in FIG. 7 causing the fingers thereof to push the parts-mass 102 against the stopper plates 116 through the bars 106. Thus, the parts-mass 102 is compressed by a certain degree. That is, as is shown in FIGS. 9A and 9B, the parts-mass 102 having the length "L1" is compressed to have a smaller size having the length "L2".

Then, the compressed parts-mass 102 is transmitted to a condenser assembling device (300) where, as is shown in FIG. 8, header pipes 105 are attached to both sides of the parts-mass 102 to constitute a condenser or heat exchanger.

Then, the moving plate 117 is moved backward, that is, rightward in FIG. 6 and retracted into the opening 115a of the flat table 115. A next parts-mass (102) waiting on the right portion of the flat table 115 is slid to the left or front portion of the table 115 for the compression of the same.

As is described hereinabove, in the parts-mass compressing device 200 of the second embodiment of the present invention, due to usage of the toggle mechanisms 120A and 120B, a counterforce inevitably produced when the parts-mass 102 is compressed by the moving plate 117 hardly affects the power cylinder mechanism 125. Thus, the parts-mass 102 can be compressed to a given size with precision.

Due to the nature of the toggle mechanisms 120A and 120B, the compression applied to the parts-mass 102 at a final stage of the compression stoke is slowly carried out. This brings about improvement in having an assured shape or size of the compressed parts-mass 102.

Because the toggle mechanism 120A or 120B can produce a marked pressing force due to its nature, it needs only a lower power type as the power cylinder mechanism 125. Furthermore, the arrangement wherein the toggle links 124a and 124b extend generally perpendicular to the power cylinder mechanism 125 can make the entire of the toggle mechanisms 120A and 120B compact in size.

Figure 10:
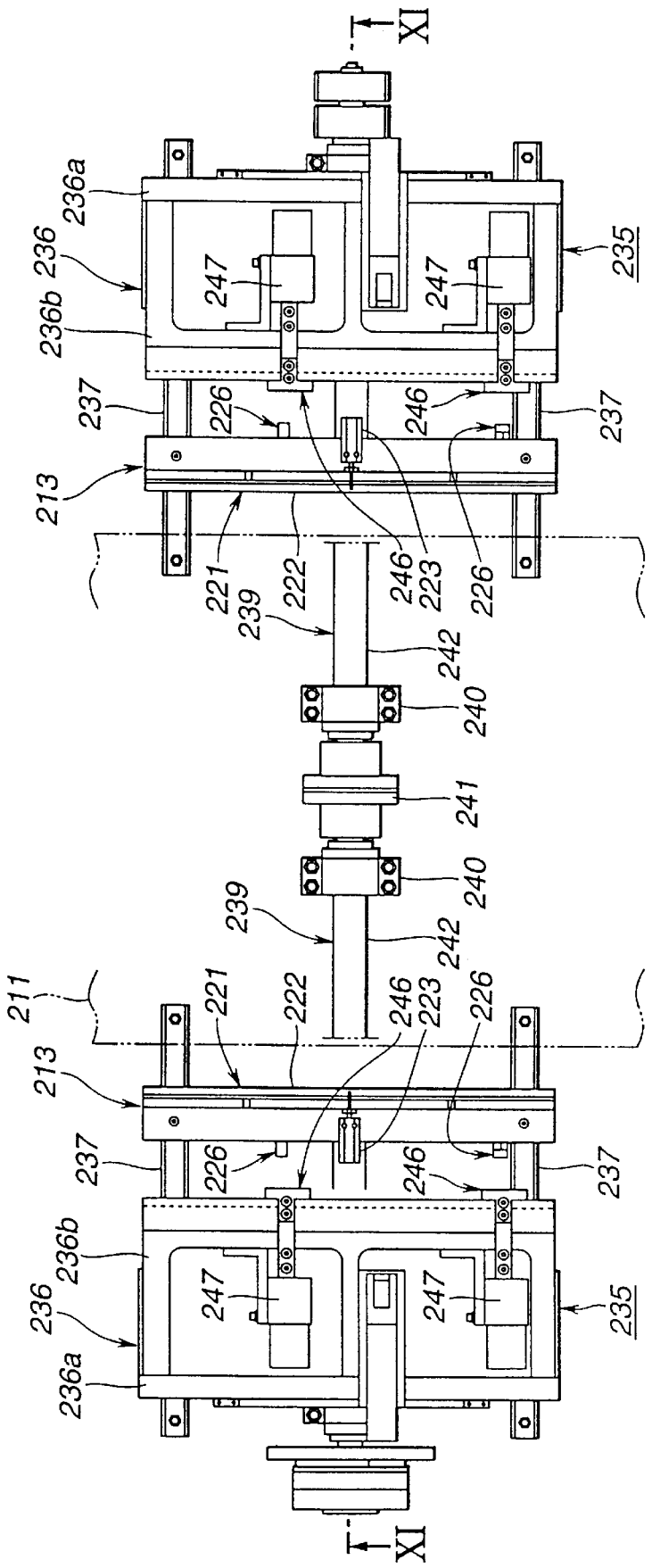
FIG. 10 is a plan view of an assembling device of a third embodiment of the present invention.
Figure 11:
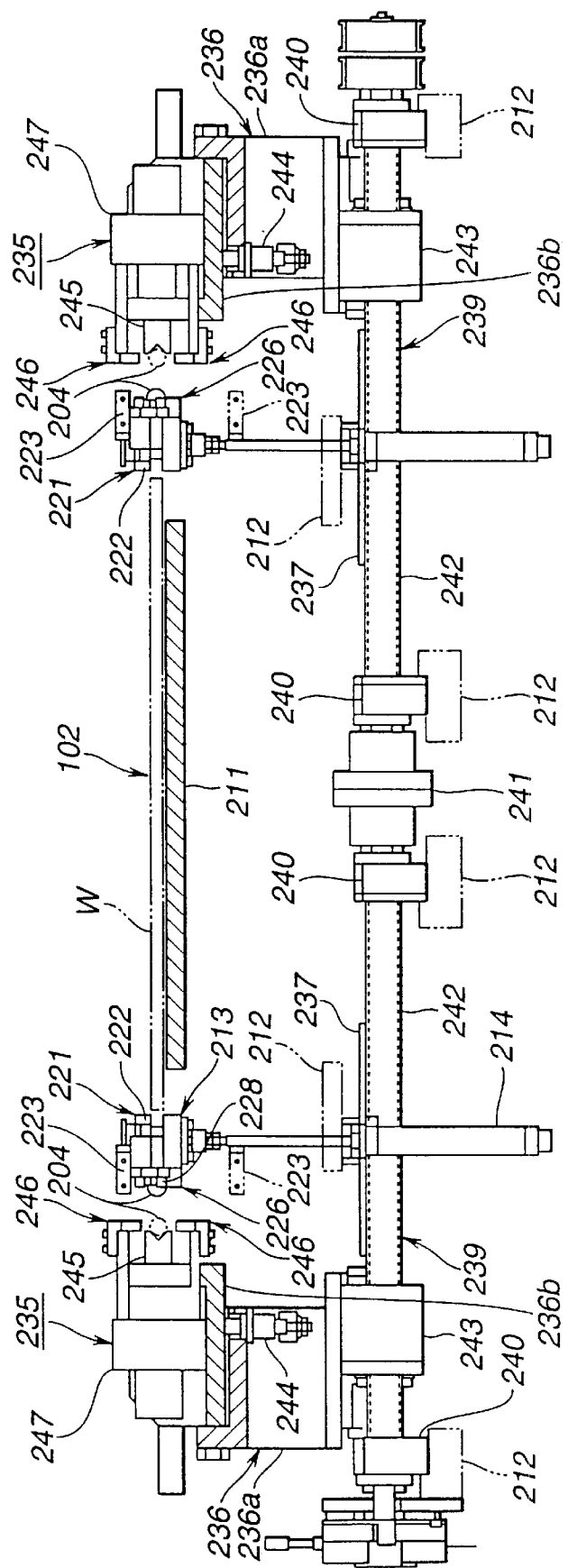
FIG. 11 is a sectional view taken along the line XI—XI of FIG. 10.
Figure 12:
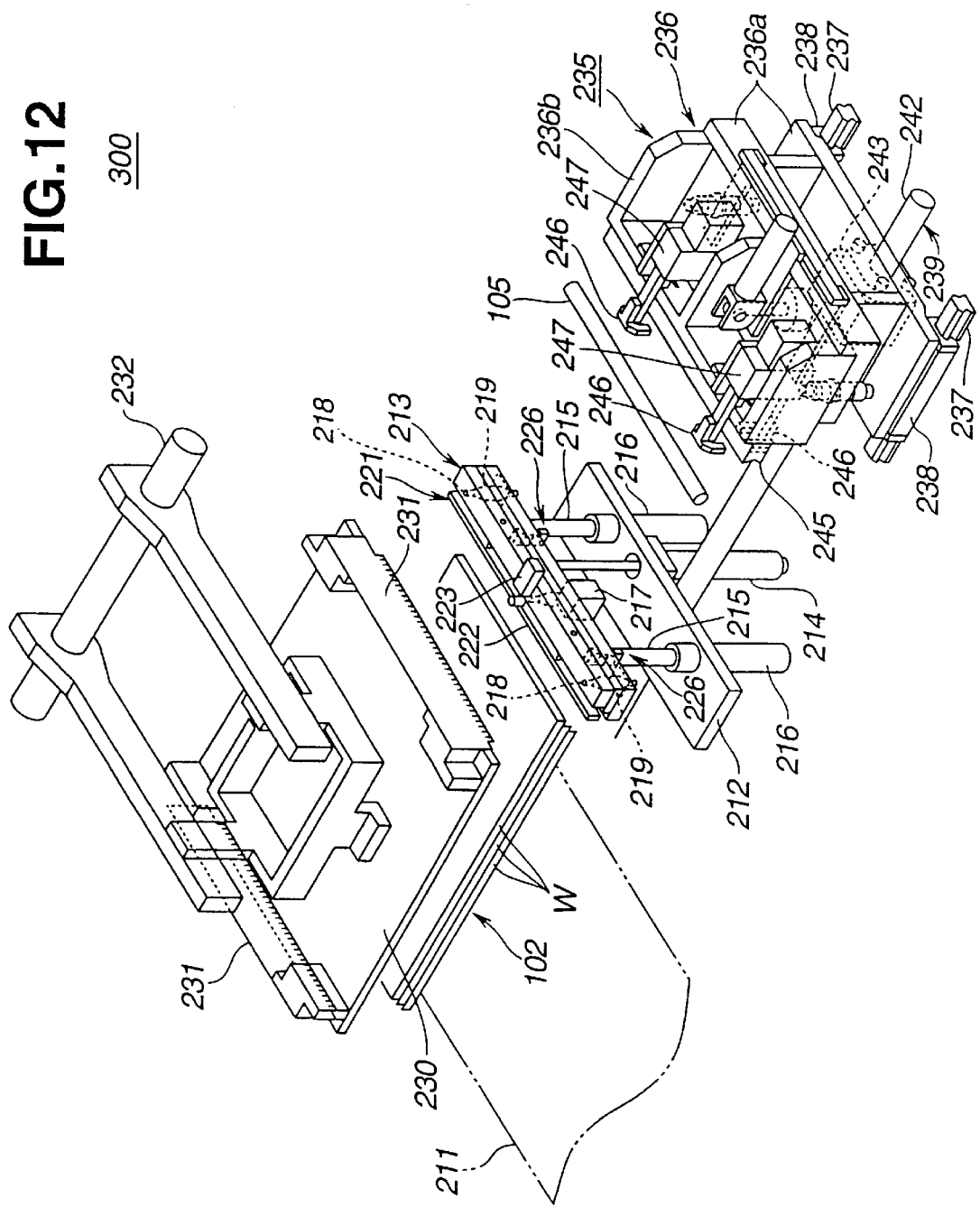
FIG. 12 is a perspective view of the assembling device of the third embodiment with some structures removed.

Referring to FIGS. 10 to 19, particularly FIGS. 10 to 12, there is shown a condenser assembling device 300 of the third embodiment of the present invention, which is arranged in the manufacturing line just downstream of the above-mentioned parts-mass compressing device 200 of the second embodiment.

In FIGS. 10 to 12, there is shown the condenser assembling device 300. Denoted by numeral 211 in FIGS. 10 and 11 is a flat table onto which the above-mentioned compressed parts-mass 102 is supplied.

Figure 19:
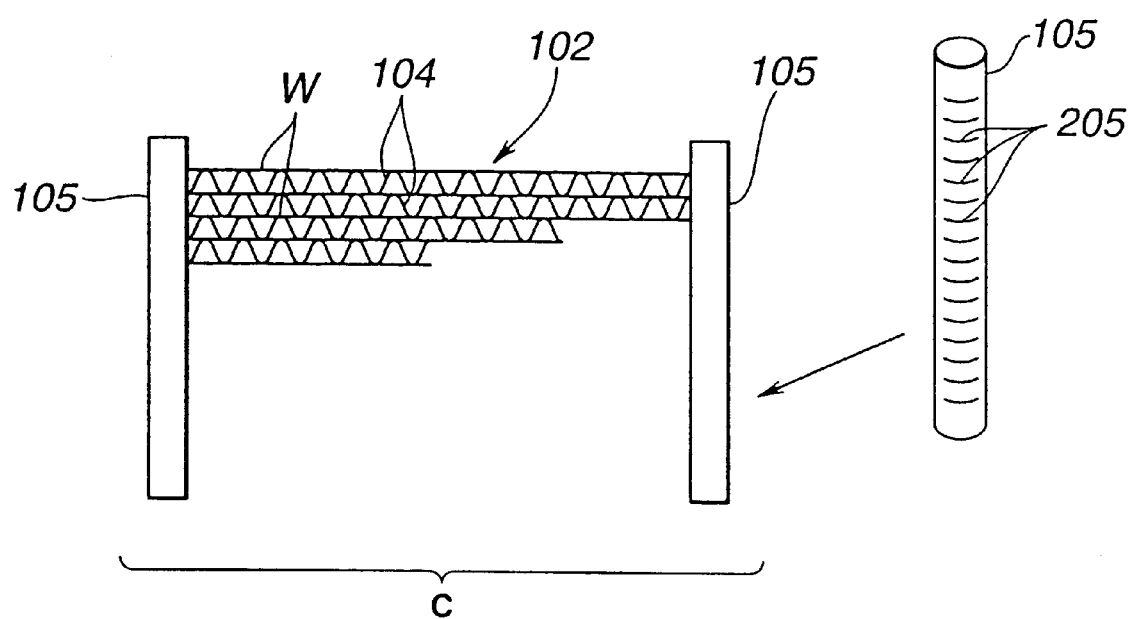
FIG. 19 is a schematic view of a condenser which is produced by a manufacturing line which includes the assembling device of the third embodiment.

The compressed parts-mass 102 is shown in FIG. 19, which comprises flat tubes "W" and corrugated outer fins 104 which are alternatively arranged. In this drawing, denoted by 105 are header pipes which are to be secured to respective sides of the compressed parts-mass 102. Each header pipe 105 is formed with a plurality of slits 205 to which open ends of the flat tubes "W" are connected.

As is understood from FIG. 11, at both sides of the flat table 211, there are arranged retractable head members 213.

Each head member 213 is vertically driven by a power cylinder mechanism 214 fixed to one of frames 212.

As is seen from FIG. 12, the vertical movement of each head member 213 is guided by two guide structures each including a guide rod 215 which is fixed to the head member 213 and a rod holder 216 which is slidably engaged with the guide rod 215 and fixed to the frame 212.

Figure 13:
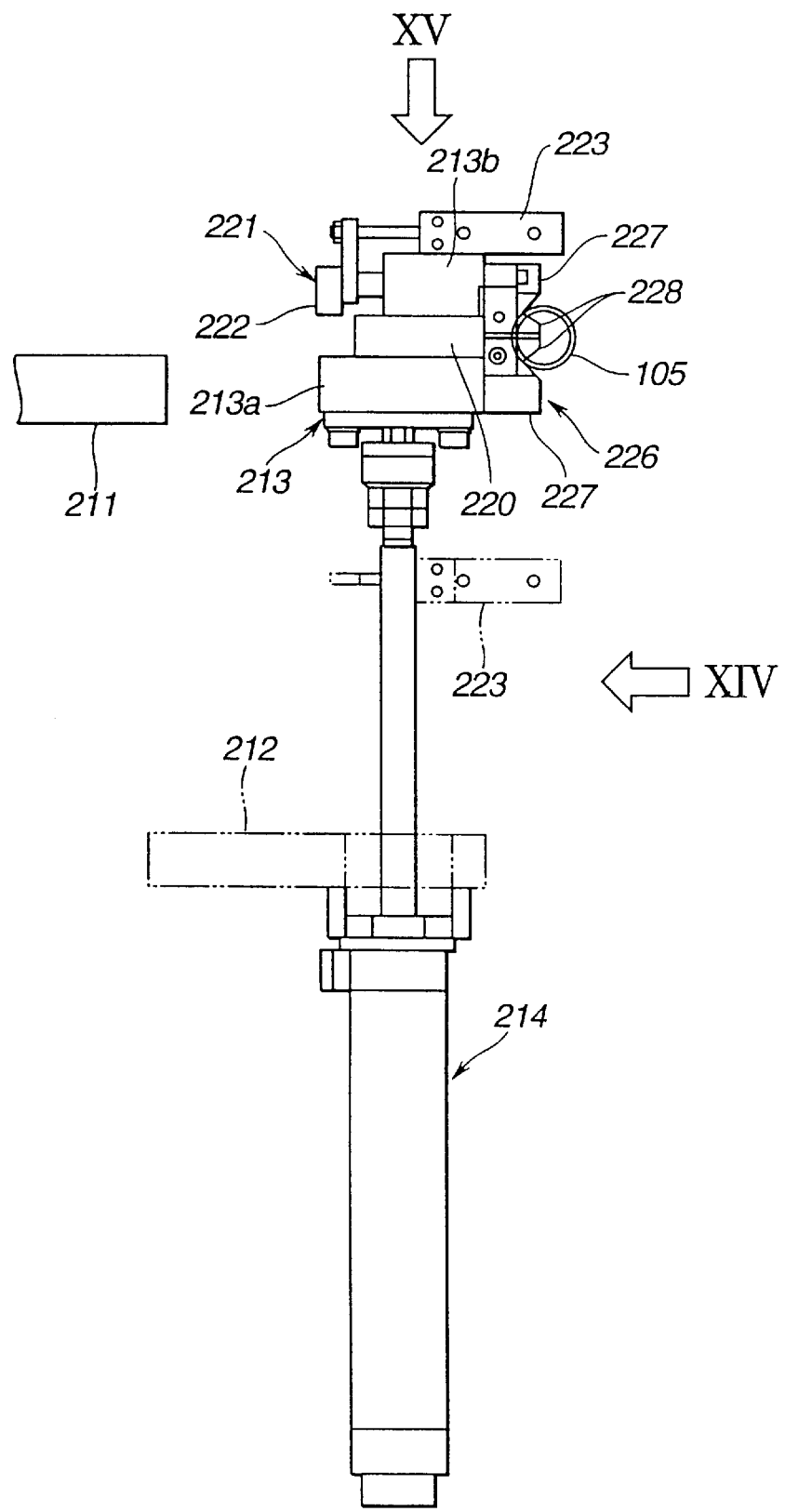
FIG. 13 is an enlarged side view of one retractable head member and its associated parts, which are employed in the assembling device of the third embodiment.
Figure 14:
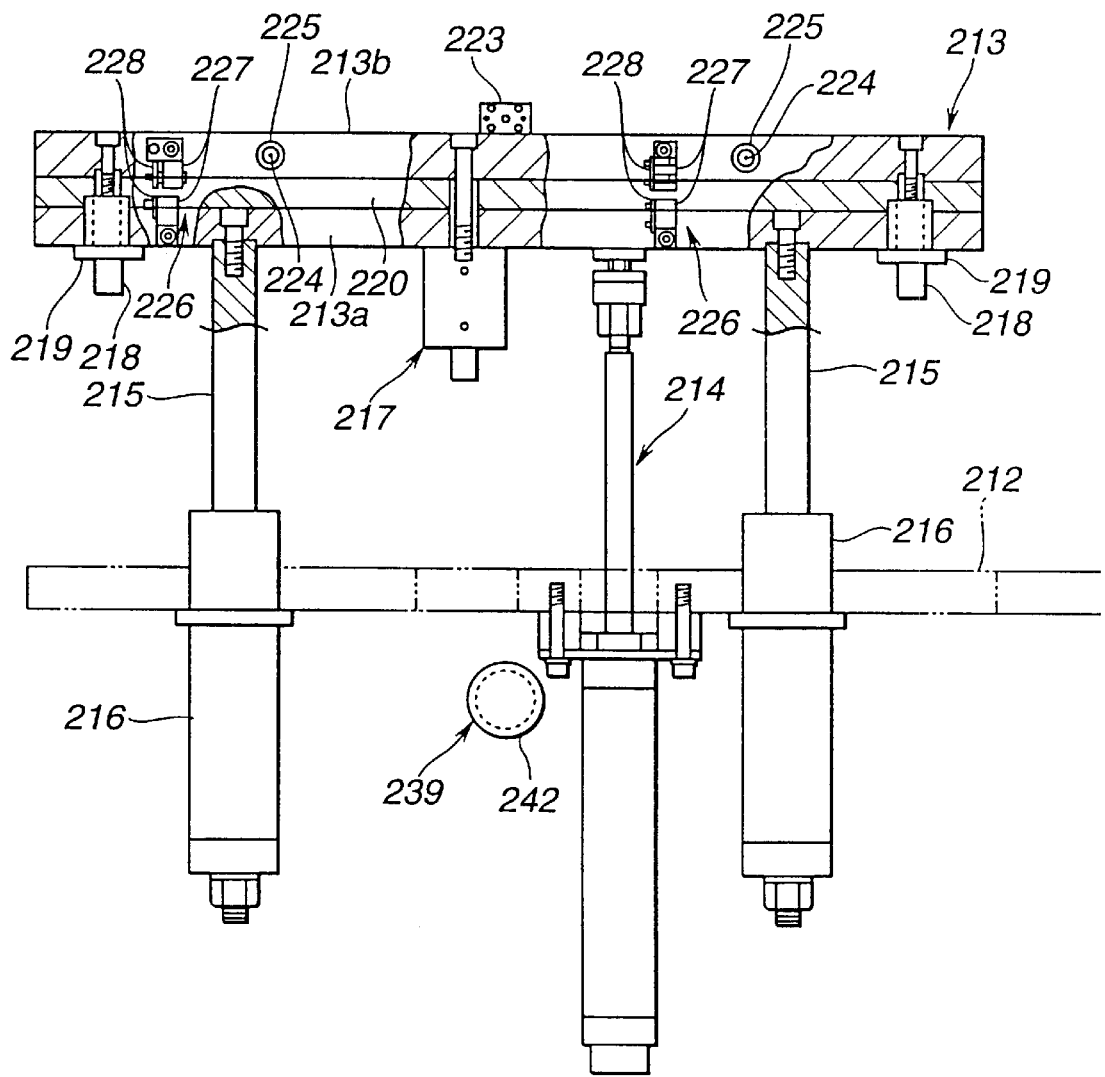
FIG. 14 is a view taken from the direction of an arrow "XIV" of FIG. 13.

As is seen from FIGS. 13 and 14, each head member 213 comprises a lower head part 213a to which the guide rods 215 are fixed and an upper head part 213b which is mounted on the lower head part 213a through a shim 220. As is best shown in FIG. 14, the upper head part 213b is vertically movable relative to the lower head part 213a by means of a power cylinder mechanism 217. The mechanism 217 comprises a power cylinder fixed to the lower head part 213a, a piston stem passing through an opening of the shim 220 and having an upper end fixed to the upper head part 213b. For guiding the vertical movement of the upper head part 213b, two guide structures are employed each including a guide rod 218 which is fixed to the upper head part 213b and a rod holder 219 which is slidably engaged with the guide rod 218 and fixed to the lower head part 213a.

It is to be noted that the shim 220 can be replaced with another shim. That is, in accordance with the size of the parts-mass 102 supplied to the flat table 211, the shift 220 can be replaced with a suitable one (220).

Figure 15:
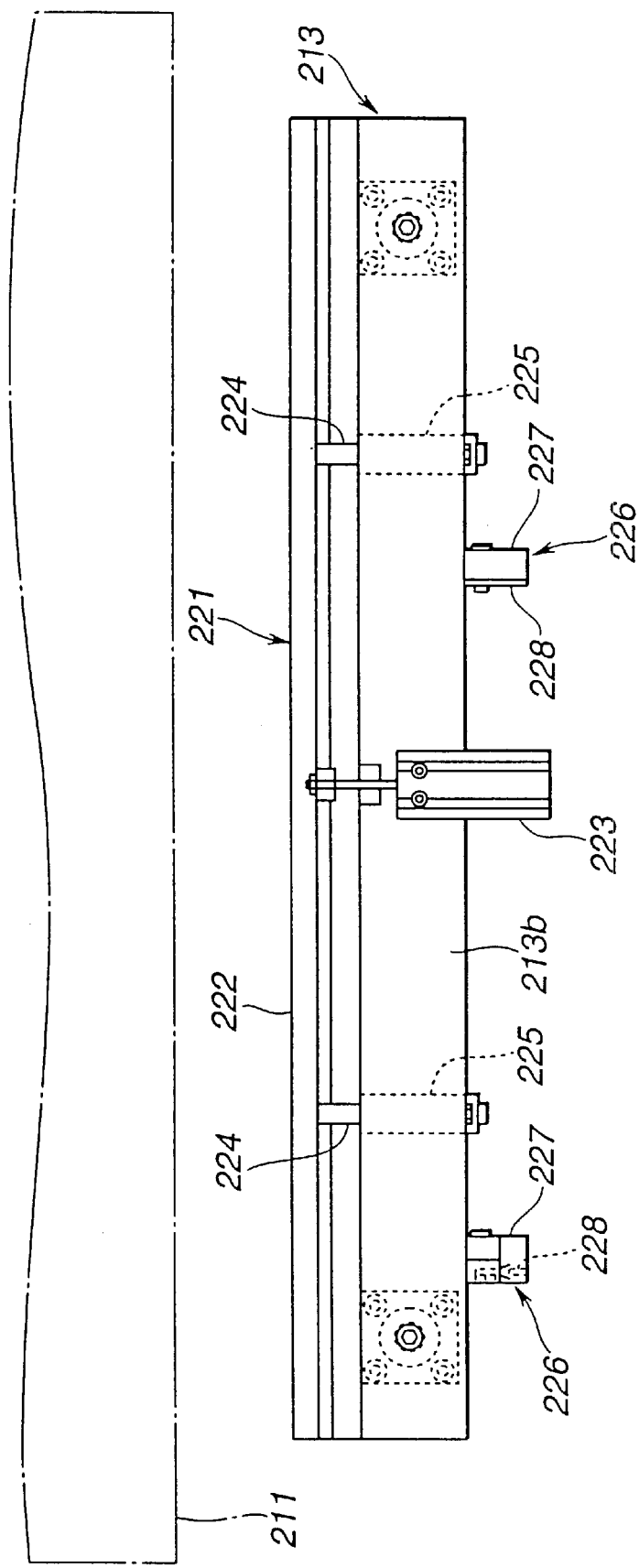
FIG. 15 is a view taken from the direction of an arrow "XV" of FIG. 13.

As is seen from FIGS. 12 and 15, each upper head part 213b is equipped with an edge lining up mechanism 221 which can line up edges of the flat tubes "W" of the compressed parts-mass 102.

As is seen from FIGS. 13 and 15, the edge lining up mechanism 221 comprises a movable bar 222 which extends along the inside surface of the upper head part 213b and a power cylinder mechanism 223 which drives the movable bar 222 toward and away from the flat table 211. For guiding the movement of the movable bar 222, two guide structures are employed each including a guide rod 224 which is fixed to the movable bar 222 and a rod holder 225 which is slidably engaged with the guide rod 224 and fixed to the upper head part 213b.

As is seen from FIGS. 12, 13 and 15, at an outside portion of each head member 213, there is provided a header pipe temporarily holding mechanism which temporarily holds the header pipe 105. The temporarily holding mechanism comprises two identical structures 226.

As is seen from FIG. 13, each structure 226 of the temporarily holding mechanism comprises lower and upper blocks 227 respectively connected to the lower and upper head parts 213a and 213b. These blocks 227 are provided at their mutually facing sides with slopes which constitute a V-shaped recess for receiving the header pipe 105 in an after-mentioned manner. As is seen from FIGS. 13 and 14, the lower and upper blocks 227 are respectively provided with lower and upper pawls 228.

To hold the header pipe 105 in the V-shaped recess, the two pawls 228 are manually put into one of the slits 205 (see FIG. 19) of the header pipe 105 and the upper head part 213b is somewhat lifted from the lower head part 213a by energizing the power cylinder 217. That is, due to the separation of the lower and upper head parts 213a and 213b, the two pawls 228 resiliently abut against opposed edges of the slit 205 thereby tightly holding the header pipe 105.

As is seen from FIG. 12, above the flat table 211, there is arranged a parts-mass pressing board 230 which functions to press down the parts-mass 102 against the flat table 211. The parts-mass pressing board 230 pivots upward and downward about a horizontal pivot shaft 232. Although now shown in the drawing, a drive device is used for driving the board 230.

That is, after lining up the edges of the flat tubes "W" of the compressed parts-mass 102 by the edge lining up mechanism 221, the pressing board 230 is pivoted down for pressing the parts-mass 102 against the flat table 211. The pressing board 230 is provided at its both sides with comb-shaped pitch adjusting plates 231 each having teeth directed downward. That is, when the pressing board 230 is pivoted down to its pressing position, the teeth of each pitch adjusting plate 231 function to adjust the pitches of the lined up edges of the raised flat tubes "W" with respect to the slits 205 of the header pipe 105.

As is seen from FIGS. 10 and 11, behind the head members 213, there are arranged two identical header pipe fitting devices 235, each functioning to take in the header pipe 105 from the temporarily holding mechanism 226 and press the header pipe 105 against the trued up and lined up edges of the flat tubes "W" thereby to press fit the edges into the slits 205 of the header pipe 105.

Figure 16:
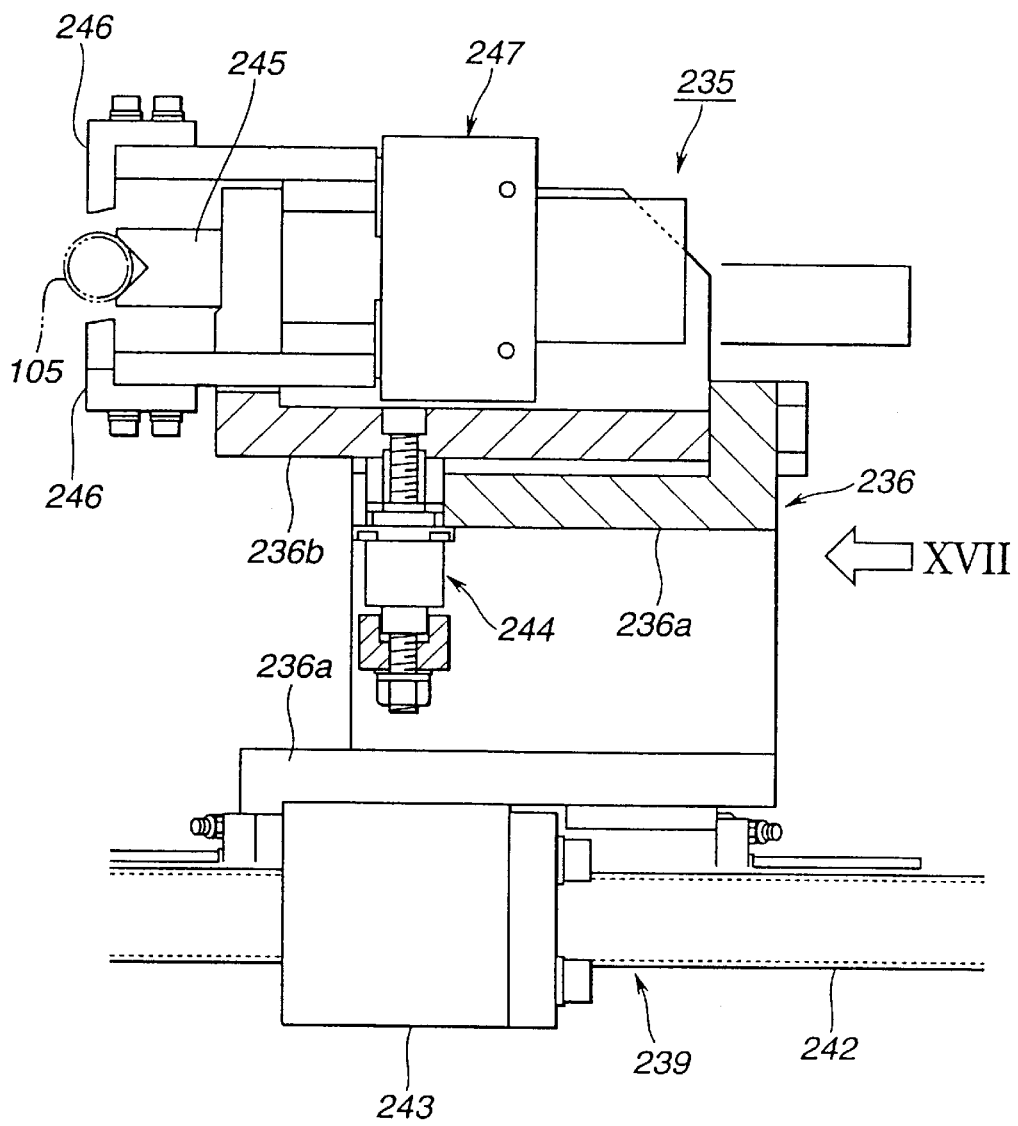
FIG. 16 is a side view of one header pipe fitting device and its associated parts, which are employed in the assembling device of the third embodiment.
Figure 17:
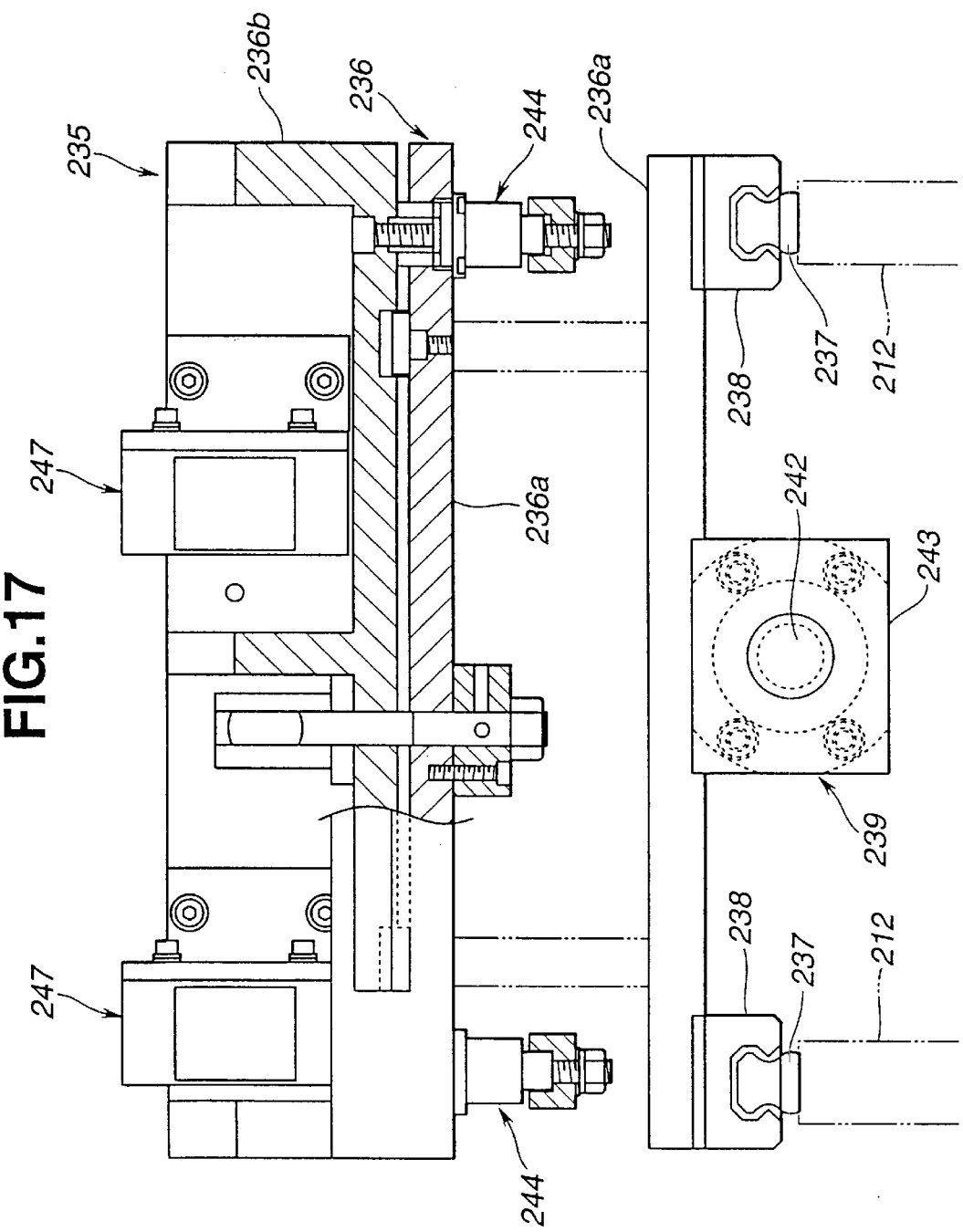
FIG. 17 is a view taken from the direction of an arrow "XVII" of FIG. 16.
Figure 18A:
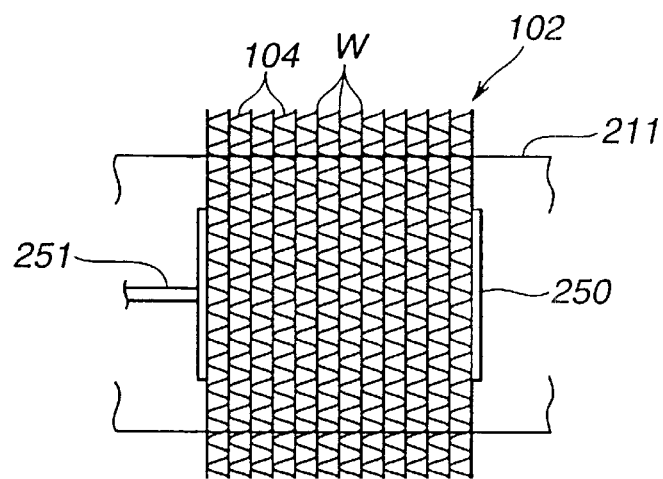
FIGS. 18A, 18B and 18C are illustrations for explaining the steps for fitting header pipes to opposed sides of a compressed mass of raised flat tubes.
Figure 18B:
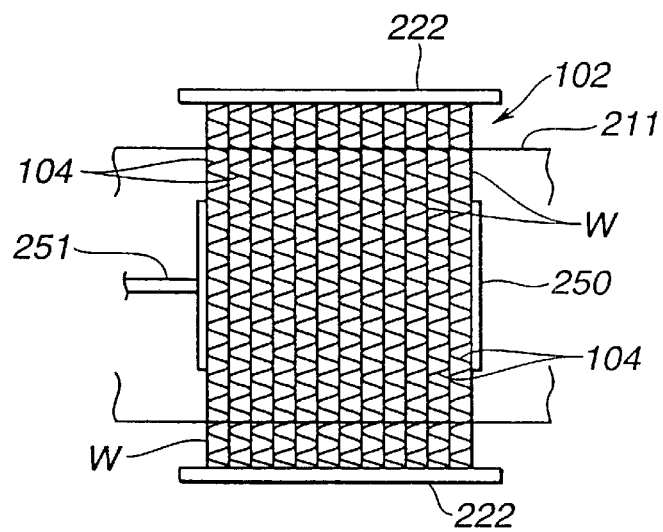
Figure 18C:
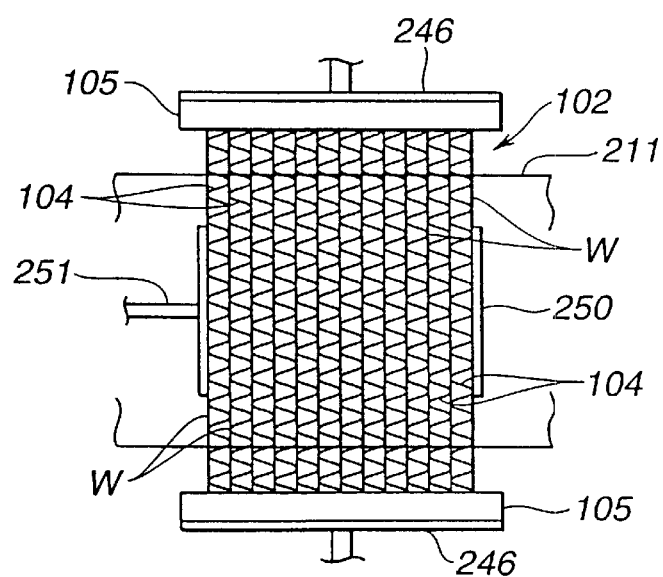

As is seen from FIGS. 12, 16 and 17, each header pipe fitting device 235 comprises two guide rails 237 mounted on the frames 212 (see FIG. 17). As shown in FIG. 12, the guide rails 237 extend perpendicular to the flat table 211, that is, perpendicular to the longitudinal axis of the head member 213. A movable stage 236 slides on the guide rails 237. For this sliding, two slide guides 238 are fixed to the movable stage 236, which slide on the guide rails 237.

As is seen from FIGS. 10 and 11, for synchronously moving the two movable stages 236 in fore-and-aft directions along the guide rails 237, two drive mechanisms 239 are employed, which are arranged in a lower portion of the condenser assembling device 300.

The drive mechanisms 239 comprise two aligned screw shafts 242 which are rotatably supported by bearings 240 disposed on the frames 212 (see FIG. 11). The two screw shafts 242 have mutually opposite thread grooves and have inner ends connected to each other through a coupling 241. Operatively engaged with the screw shafts 242 are nut members 243 which are fixed to lower portions of the respective movable stages 236.

As is seen from FIG. 16, each movable stage 236 comprises a lower stage part 236a and an upper stage part 236b which is arranged on the lower stage-part 236a. For vertically moving the upper stage part 236b relative to the lower stage part 236a, two position adjusters 244 (see FIG. 17) are employed each including a nut member which is connected to the lower stage part 236a and a screw shaft which is operatively engaged with the nut member and has a head portion connected to the upper stage part 236b. That is, in accordance with the size of the header pipe 105 held by the temporarily holding mechanism 226, the height of the upper stage part 236b is adjusted by manipulating the position adjusters 244.

As is seen from FIGS. 12 and 16, the upper stage part 236b of each movable stage 236 is provided, at a side thereof facing the corresponding temporarily holding mechanism 226, with a horizontally extending elongate block 245 which has a V-shaped groove for receiving therein the header pipe 105. As is seen from FIG. 12, the movable upper stage part 236b is provided at the side facing the corresponding temporarily holding mechanism 226, with two pairs of pipe clamps 246, each including, as is seen from FIG. 16, lower and upper clamp members (no numerals) between which the elongate block 245 is located. Two power cylinder mechanisms 247 are employed for actuating the two pairs of the clamp members. That is, due to operation of each mechanism 247, lower and upper clamp members are moved toward and away from each other. That is, when each power cylinder mechanism 247 is energized, the two clamp members move toward each other to stably hold the header pipe 105 in the V-shaped groove of the elongate block 245.

In the following, operation of the above-described condenser assembling device 300 will be described with reference to the drawings.

For ease of understanding, the description will be commenced with respect to a condition wherein the aforementioned compressed parts-mass 102 (see FIG. 19) is placed on the flat table 211, as is seen from FIG. 11 and the two retractable head members 213 assume their upper or work positions as is seen from FIG. 12. As is described hereinabove, the compressed parts-mass 102 comprises the flat tubes "W" and the corrugated outer fins 104 which are arranged alternatively. As is seen from FIG. 18A, if desired, the mass 102 on the flat table 211 is kept compressed by fixed and movable plates 250 and 251 to keep a desired size thereof.

Upon sensing presence of the compressed parts-mass 102 on the flat table 211, the two edge lining up mechanisms 221 held by the head members 213 start to operate synchronously thereby moving the respective movable bar 222 (see FIGS. 11 and 12) toward the opposed edges of the flat tubes "W" of the mass 102 to line up the same. This edge lining up operation will be well understood from FIG. 18B.

After lining up the edges of the flat tubes "W" of the mass 102, each movable bar 222 is moved back by the power cylinder mechanism 223, and at the same time, as is seen from FIG. 12, the parts-mass pressing board 230 is pivoted down to press the properly arranged mass 102 against the flat table 211. Upon this, each comb-shaped pitch adjusting plate 231 adjusts the pitches of the lined up edges of the raised flat tubes "W".

Then, a header pipe 105 is manually put into the V-shaped recess of the blocks 227 (see FIG. 13) having the pawls 228 of the header pipe temporarily holding mechanism 226 put into slits 205 of the header pipe 105. Then, each upper head part 213b is slightly lifted from the lower head part 213a by the power cylinder mechanism 217 to assure holding of the header pipe 105 by the pawls 228.

Then, the two drive mechanisms 239 start to operate synchronously. With this, the movable stage 236 of each header pipe fitting device 235 is moved toward the header pipe 105 held by the header pipe temporarily holding mechanism 226.

When, during movement of the movable stage 236 toward the header pipe 105, the V-shaped groove of the elongate block 245 is brought into contact with the header pipe 105, the movable state 236 stops. Upon this, the power cylinder mechanisms 247 are energized to cause the two pairs of pipe clamps 246 to grip the header pipe 105. Then, the upper head part 213b of the header pipe temporarily holding mechanism 226 is moved down by the power cylinder mechanism 217 to release is the header pipe 105 from the pawls 228.

Then, each movable stage 236 is moved back to a given rear position by the drive mechanism 239, and at the same time, each head member 213 equipped with the edge lining up mechanism 221 and the head pipe temporarily holding mechanism 226 is moved down to a given lower position by the power cylinder mechanism 214.

Then, due to operation of the drive mechanism 239, each movable stage 236 is moved forward together with the header pipe 105 held thereby to press the header pipe 105 against the lined up edges of the flat tubes "W" of the mass 102. During this, as is seen from FIG. 18C, the slits 205 of the header pipe 105 are brought into engagement with the edges of the flat tubes "W" respectively.

Then, the movable state 236 is moved back to the given rear position again, and at the same time, the parts-mass pressing board 230 is pivoted up. Thus, a so-called semi-finished condenser "C" as shown in FIG. 19 can be removed from the flat table 211. Of course, this semi-finished product "C" is then transmitted to a welding or brazing section of the manufacturing line to finish the product "C".

Then, the two retractable head members 213 are moved up to their upper or work positions to deal with a subsequent assembling operation.

As is described hereinabove, in the condenser assembling device 300 of the third embodiment of the present invention, due to a systematic usage of the edge lining up mechanisms 221, the parts-mass pressing board 230 and the header pipe fitting devices 235, the semi-finished product "C" is effectively produced.

Furthermore, due to usage of the comb-shaped pitch adjusting plates 231 mounted to the parts-mass pressing board 230, downward pivoting of the pressing board 230 onto the parts-mass 102 automatically brings about adjustment of the pitches of the edges of the flat tubes "W" of the mass 102. Thus, the subsequent work for fitting the header pipe 105 to the edges of the flat tubes "W" by the header pipe fitting devices 235 is assuredly carried out.

Although the invention has been described above by reference to certain embodiments of the invention, the invention is not limited to the embodiments described above. Modifications and variations of the embodiments described above will occur to those skilled in the art, in light of the above teachings.

What is claimed is:

1. In a manufacturing line handling elongate and flat workpieces, an assembling device comprising:
   a base stand having a table structure on which a mass of raised workpieces is put horizontally, each work piece standing vertically on said table structure on one longer side thereof;
   two head members arranged at both sides of said table structure, each head member being vertically moved by a drive unit;
   two edge lining up mechanisms carried by said head members respectively, each lining up mechanism including a movable bar which is moved toward edges of the raised workpieces on said table structure to abut against said edges to line up the same;
   two header pipe temporarily holding mechanisms carried by said head members respectively, each temporarily holding mechanism temporarily holding a header pipe which is to be fixed to a side of the mass of the raised workpieces;
   a parts-mass pressing board for pressing said mass against said table structure; and
   two header pipe fitting devices arranged at both sides of said table structure, each fitting device catching said header pipe from said temporarily holding mechanism and pressing the same against the side of said mass thereby to connect the same to said side.

2. An assembling device as claimed in claim 1, in which each of said head members comprises:
   a lower head part;
   an upper head part which is vertically movable relative to said lower head part; and
   a drive unit for inducing the vertical movement of said upper head part.

3. An assembling device as claimed in claim 2, in which each of said header pipe temporarily holding mechanisms comprises:
   a lower pawl fixed to said lower head part; and
   an upper pawl fixed to said upper head part,
   wherein, upon requirement of holding said header pipe, the lower and upper pawls are put into a slit formed in said header pipe and said upper head part is lifted up slightly from said lower head part.

4. An assembling device as claimed in claim 3, in which each of said header pipe temporarily holding mechanisms further comprises:
   a lower block having a sloped surface, said lower block being secured to said lower head part having said sloped surface directed upward; and
   an upper block having a sloped surface, said upper block being secured to said upper head part having said sloped surface directed downward,
   wherein the sloped surfaces of said lower and upper blocks constitute a generally V-shaped groove which receives therein said header pipe.

5. An assembling device as claimed in claim 1, in which said parts-mass pressing board is pivotally supported by a horizontal pivot shaft.

6. An assembling device as claimed in claim 1, in which said parts-mass pressing board is provided at its both sides with comb-shaped pitch adjusting plates, each adjusting plate adjusting pitches of edges of the raised workpieces on said table structure when said parts-mass pressing board is pivoted down to press the mass of the raised workpieces.

7. An assembling device as claimed in claim 1, in which each of said header pipe fitting devices comprises:
   guide rails extending toward said table structure;
   a movable stage sliding on said guide rails;
   a drive mechanism for moving said movable stage on said guide rails; and
   a pipe clamp mechanism carried by said movable stage, said pipe clamp mechanism including lower and upper clamp members which are vertically movable relative to each other and a power cylinder mechanism for moving said lower and upper clamp members toward and away from each other.

8. An assembling device as claimed in claim 7, in which said movable stage comprises:
   a lower stage part;
   an upper stage part to which said pipe clamp mechanism is mounted; and
   a position adjuster for adjusting a vertical position of said upper stage part relative to said lower stage part.

9. An assembling device as claimed in claim 8, in which said upper stage part is equipped with a horizontally extending elongate block which has a V-shaped groove for receiving therein said header pipe when said pipe clamping mechanism clamps the header pipe.

* * * * *